Patented Aug. 3, 1948

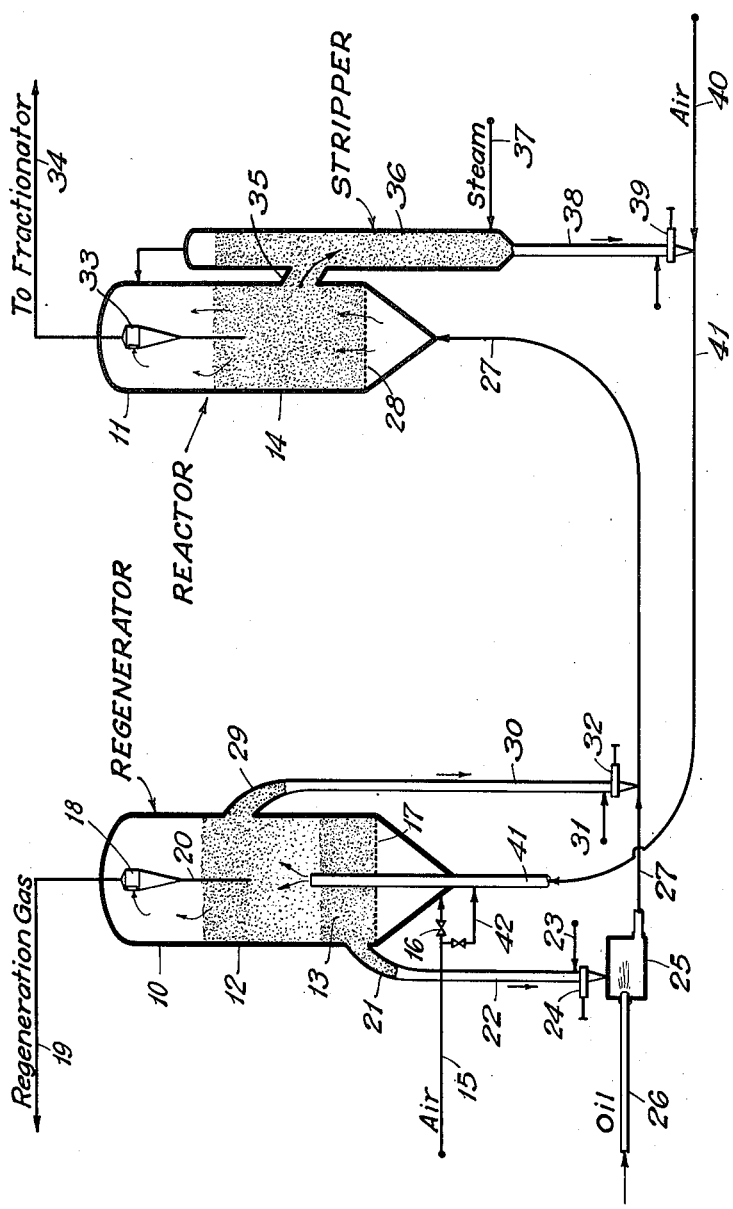

2,446,247

UNITED STATES PATENT OFFICE 2,446,247

EXOTHERMIC CATALYTIC REACTIONS

Fred W. Scheineman, Chicago, Ill., assignor to Standard Oil Company, Chicago, Ill., a corporation of Indiana Application November 22, 1946, Serial No. 711,756

11 Claims. (Cl. 196—52)

This invention relates to a hydrocarbon conversion process and apparatus for carrying it out. More particularly it relates to the conversion of hydrocarbons by contacting with fluidized solid catalyst wherein the catalyst becomes deactivated by deposition of carbonaceous byproducts of the reaction and then is regenerated by contacting with an oxygen-containing gas in a regeneration zone from which the regenerated catalyst is returned to the reaction zone for further use. In its broader aspects, the invention relates to a method and apparatus for contacting vapors with fluidized, powdered, solid catalyst in a reaction zone at reaction temperature to effect a chemical reaction and thereafter regenerating the partially spent catalyst in a regeneration zone at a higher temperature before recycling to the reaction zone.

One object of the invention is to utilize a part of the heat evolved in the regeneration zone for vaporizing and/or preheating the feed stock before contacting with catalyst in the reaction zone. Another object of the invention is to effect certain heat economies in the fluid catalyst conversion process without damaging the catalyst, as a result of overheating or overcarbonization. Still another object of the invention is to increase the activity level of the catalyst in the reaction zone of a fluid catalyst cracking process by preventing contact between catalyst and unvaporized oil particles or hydrocarbon vapors containing constituents with a predisposition to deposit coke on highly heated extensive surfaces.

The invention is illustrated by a drawing which shows diagrammatically an apparatus including a regenerator and a reactor for carrying out the process.

In the fluid catalyst conversion of hydrocarbons with powdered solid catalysts, particularly in the cracking of gas oil, kerosene, residual stocks, or other unvaporizable stocks, and in the reforming of heavy naphtha, etc., it is common practice to recycle the catalyst between a reaction zone and a regeneration zone. In the reaction zone, carbonaceous deposits are formed on the catalyst and these are eliminated in the regeneration zone where catalyst is contacted with air, air diluted with flue gas, or other oxygen-containing gas mixtures. In this process, a problem arises with the highly exothermic nature of the regeneration reaction where about 1 to 5 per cent of carbon deposited must be burned off of the catalyst by the air stream, necessitating very careful control of regeneration rates, for example by controlling oxygen concentration in the regeneration gas in order to avoid overheating the catalyst and permanently deactivating it. Indirect cooling means are also commonly employed. In general, the catalyst cannot safely be heated above about 1100 or 1200° F. It is also common practice to dissipate heat from the regeneration zone by recycling a part of the catalyst in fluidized, dense suspension thru an outside cooler and back to the regeneration zone. In the reaction zone the endothermic cracking reaction requires the addition of heat which is usually supplied by superheating the hydrocarbon vapors charged thereto, by indirect heating or other means.

Numerous plans have been proposed for solving this problem of heat balance by transferring a portion of the exothermic heat from the regeneration zone to the endothermic reaction zone where the heat is required, thus providing a substantially balanced process from the thermal standpoint. One plan has been to recycle large proportions of catalyst between the reaction and regeneration zones, for example ten weights of catalyst per weight of oil treated up to twenty or even thirty weights of catalyst per weight of oil treated, whereas the normal conversion reaction proceeds quite well with about two to five weights of catalyst per weight of oil. This method of heat control has resulted in increased catalyst losses, partly by excessive attrition resulting in breakdown of catalyst to ultrafine particle size, e. g. below ten microns, making it impracticable to recover by the usual methods, including cyclone separators, electrostatic precipitators, etc.

Another method of conveying heat from the reaction zone to the regeneration zone is taught in the U. S. patent of Thiele 2,400,176, according to which an inert heat carrier material is mixed with the catalyst and recycled between the zones. Still another method is taught in U. S. Patent 2,348,009, Johnson et al., according to which heat is indirectly exchanged between the two zones. Johnson U. S. 2,393,636 also shows the use of a heat carrier in a fluid catalyst system. All of these methods have certain inherent disadvantages which are overcome by the present invention.

According to my process, I employ a heat-carrier material which has a higher settling rate than the catalyst, owing to increased particle density or particle size, or both, the settling rate being sufficiently greater to permit segregation of the heat carrier as a separate layer in the lower part of the regenerator under the conditions of turbulence prevailing therein. The heat carrier is then conducted thru a separate line into contact with the hydrocarbon feed stock, giving up a substantial part of its heat to the stock and preheating the latter before injecting it into the reaction zone where it contacts the catalyst which is conducted thereto from the regenerator, preferably by the same line with the heat carrier. The process will be more readily understood by referring to the drawing.

The drawing shows a regenerator 10 and reactor 11 conveniently placed at approximately the same level, altho one unit may be elevated above the other, usually the regenerator above the reactor. In the regenerator, the catalyst is illustrated by the fine shading 12 while the heat carrier is shown by the coarse shading 13. In the reactor, the turbulence may be sufficiently greater to prevent substantial segregation of heat carrier and catalyst which are illustrated as a homogeneous mixture 14. In operation, regeneration air is admitted to the base of the regenerator by line 15 and valve 16 passing upwardly thru grid 17 and heat carrier 13. The grid 17 may have openings sufficiently small to retain heat-carrier material above it while allowing finer catalyst particles to pass thru. Regeneration air then passes upwardly thru the catalyst layer 12 and enters the dilute catalyst phase at the top of the regenerator, passing thru cyclone separator 18 and out by line 19. The catalyst recovered in separator 18 flows by dip leg 20 back to the dense phase catalyst layer 12. In the regenerator the upward velocity of the regeneration gas is suitably about 1 to 1¾ feet per second.

In previous methods of fluidized solid catalyst regeneration, it has sometimes been required to dilute the regeneration air with flue gas or other inert gas to reduce the oxygen concentration to less than about 10% in order to prevent localized overheating and destruction of catalyst. In my process I can employ undiluted air for regeneration owing to the fact that the air first comes into contact with the heat carrier in 13 and becomes reduced in oxygen concentration by the combustion of carbonaceous deposits accumulated thereon. The heat carrier is, in turn, often heated by this reaction to a temperature above that in the regeneration reaction in 12 by as much as 50 to 200° F., depending on the amount of air introduced at 16 as will be described hereinafter.

The settled density of the catalyst employed in my process is usually about forty to sixty pounds per cubic foot, whereas the settled density of the heat carrier is usually above 100 pounds per cubic foot and may be 150 to 300 pounds per cubic foot. In the cracking of hydrocarbon oils, I may use Super Filtrol, synthetic alumina-silica catalysts, alumina-magnesia-silica, thoria or zirconia on silica, e. g. on silica gel, boric oxide on alumina, etc. These catalysts are characterized by a highly porous structure providing extensive catalyst surface for effecting the desired conversion reaction. The catalyst is usually about 50 to 400 mesh or even finer, altho the preferred catalyst size is about 100 to 300 mesh. Expressed in microns, a suitable catalyst is about 20 to 250 microns particle diameter. I may use microspheroidal catalysts because of their increased ruggedness, resistance to abrasion, crushing, etc.

The heat carrier has a particle size substantially greater than that of the catalyst, for example, it may be about 10 to 25 mesh. For my purpose I prefer to employ a heat carrier with a rather narrow particle size range, e. g. 10 to 15 mesh or even coarser, in some cases 5 to 10 mesh.

For this purpose, I employ a coarse sea sand or torpedo sand, the particles of which are largely round, to increase resistance to attrition and reduce abrasion. I may also use stainless steel shot, aluminum shot, agate sand, etc., care being taken to employ a heat carrier material free from undesirable poison action on the catalyst and substantially inert to the hydrocarbon and without catalytic action thereon at the conversion temperature. The ratio of heat carrier to catalyst is suitably about one-half to four parts by weight, usually about one to two parts.

From the lower part of the regenerator the heat carrier, in dense fluidized suspension, e. g. 40 to 75 pounds per cubic foot, is withdrawn by line 21 leading to standpipe 22 where a dense fluidized column of the heat carrier is maintained and prevented from compacting by aeration gas injected at 23. From the bottom of the standpipe the carrier material flows by valve 24 into mixing chamber 25 wherein the hot material is brought into contact with the hydrocarbon feed stock introduced by line 26. The feed stock may be preheated by heat exchange with hot products of the reaction or by a preheating furnace, preferably a pipe still. The temperature of the feed stock is suitably about 600 to 800° F., altho if desired it may be preheated somewhat above the cracking temperature, e. g. to 900° F. The amount of preheating of the feed stock is governed largely by the heat balance in the system. Sufficient preheating is supplied to maintain the desired temperature level in the reactor and regenerator. Under some conditions the oil may be supplied in liquid form and vaporized in mixer 25 by contact with hot carrier material from 13, the temperature of which is ordinarily about 900 to 1100° F. but may be considerably hotter, e. g. 1200–1400° F. When injecting a liquid feed stock into mixer 25 it is preferred to atomize it to obtain rapid vaporization and prevent formation of coke masses in the case of dirty stocks. Steam or other vapor may be employed for this purpose.

The heated hydrocarbon vapors and heat carrier pass by line 27 to reactor 11 where they are distributed by grid 28. Regenerated catalyst is drawn from the dense phase in regenerator 12 by line 29 to standpipe 30 where the catalyst is maintained in dense suspension by aeration gas injected at 31. The catalyst enters into contact with the feed stock thru valve 32 and is conducted to the reactor by line 27. The dense catalyst phase 12 in regenerator 10 will be about 15 to 30 pounds per cubic foot, whereas the dilute suspension in the top of the regenerator will usually have a density of less than one pound per cubic foot.

The catalyst and hydrocarbon reacting in reactor 11 pass from the dense phase 14 thru cyclone separator 33 and thence by line 34 to product recovery means, for example a fractionator. The density of the dense catalyst phase in 11 may suitably be about the same as in the regenerator 10 altho a somewhat lower density is contemplated. In the preferred operation, the vapor velocity in the reactor is sufficient to prevent any substantial segregation of heat carrier therein and the heat carrier is maintained substantially mixed with the catalyst thereby supplying to the catalyst the necessary heat of cracking thruout a wide temperature range. The upward vapor velocity in the reactor is suitably about one and one-quarter to two feet per second.

From a low point in reactor 11, catalyst and heat carrier are withdrawn at 35 into stripper 36 fed by stripping steam thru line 37 and thence thru standpipe 38 and valve 39 where the mixture of catalyst and heat carrier is introduced into a carrier gas stream, for example air or an inert gas such as flue gas charged by line 40, the mixture being conducted by line 41 to regenerator 10. It is preferred to introduce the mixture of catalyst and heat carrier at an intermediate level in the regenerator above the level of drawoff outlet 21. The concentration of catalyst in the heat-carrier layer 13 is maintained quite low by the sweeping action of regeneration air introduced at valve 16. Additional regeneration air may be injected into the spent catalyst stream by valved line 42. Thus by partly closing valve 16 and opening the valve in line 42, less air is admitted to the layer of heat carrier in 13 without reducing the total amount of air available for the regeneration reaction in 12.

Instead of recycling the catalyst and heat carrier to an intermediate point in the regenerator 10 as shown in the drawing, I may introduce them into the base of the regenerator below grid 17, employing a grid having openings sufficiently large to permit the upward passage of heat-carrier material therethru. To prevent carryover of catalyst with heat carrier thru outlet 21 and standpipe 22, when operating in this way, I can employ a catayist-denuding section between the outlet 21 and standpipe 22 into which a suitable gas is injected at sufficient velocity to force the catalyst particles upward and back into the regenerator 10, thereby preventing the passage of catalyst into contact with the hydrocarbon feed in mixer 25. For denuding purposes, I may employ air, flue gas, or a spent combustion gas from line 19, if desired.

In the operation of the process, the standpipes 22, 30 and 33 serve the purpose of maintaining a differential pressure on the catalyst and heat carrier sufficient to obtain the desired rate of flow therethru. The amount of pressure built up in this way is determined by the height of the standpipes and the density of the finely divided material therein. A catalyst residence time or duration of exposure of catalyst to oil in 11 of about five minutes to one hour is usually employed in hydrocarbon conversion operations such as gas oil cracking, preferably about 10 to 15 minutes. To prevent any segregation of cataylst and heat carrier in reactor 11, it is desirable that the drawoff point 35 be intermediately located in order that both the heat carrier and the catalyst may flow back to the regenerator together. As a result of this arrangement, a considerable amount of the heat carrier having a high heat capacity is maintained in the reactor in contact with the catalyst and hydrocarbons undergoing conversion and serves not only to supply the necessary heat to the reaction but to stabilize the reactor temperature.

In general, the pressures employed in my process are relatively low, usually within the range of 5 to 50 p. s. i. In order to reduce the cost of compressing air for regeneration, it is usually desirable to maintain the pressure in the regenerator somewhat lower than that in the reactor and this may be accomplished by placing the regenerator at a higher level than the reactor and overcoming the pressure differential by means of longer standpipes 21 and 30.

Having thus described my invention what I claim is:

1. In the process of conducting chemical reactions wherein a vapor is contacted with a fluidized, solid, finely divided catalyst in an endothermic reaction zone in which the catalyst is maintained in dense fluid suspension by upflowing vapor and from which the catalyst is continuously conveyed to an exothermic regeneration zone wherein the catalyst is maintained at a higher temperature in dense fluid suspension by an upflowing stream of regeneration gas, after which the catalyst is returned to said reaction zone for the treatment of further quantities of said vapors, the improvement comprising circulating within said system in contact with said catalyst a subdivided heat-carrier material of sufficiently higher density and particle size than said catalyst, to effect segregation in a separate lower layer within said regeneration zone, separately withdrawing said heat carrier from said regeneration zone and mixing it with said vapor before the vapor contacts said catalyst, injecting the mixture of heat carrier and vapor into said reaction zone and recycling heat carrier with said catalyst from said reaction zone to said regeneration zone.

2. The process of claim 1 wherein the heat carrier and catalyst recycled to said regeneration zone are introduced at an intermediate point therein above the point of withdrawal of said heat carrier and a current of regeneration gas is forced upwardly thru said heat carrier material collected in the base of said regeneration zone at sufficient velocity to remove particles of catalyst therefrom.

3. In the process of converting hydrocarbons in a system comprising a catalytic reaction zone and a catalyst regeneration zone wherein said hydrocarbons are contacted in said reaction zone at conversion temperature with a fluidized, finely divided, solid catalyst maintained in dense phase suspension by the upflowing vapors of said hydrocarbons and the catalyst, contaminated with carbonaceous deposits, is regenerated by conducting it to said regeneration zone where it is contacted at a still higher temperature with an oxygen-containing regeneration gas for the removal of said deposits by combustion, the catalyst being maintained in dense fluid suspension in said regeneration zone by said regeneration gas flowing upwardly therethru and the regenerated catalyst is recycled to said reaction zone, the improvement comprising employing in contact with said catalyst in said system a subdivided solid heat carrier material having a sufficiently higher particle size and density to effect segregation in a lower layer within said regeneration zone, withdrawing said heat carrier from said lower layer to a hydrocarbon mixing zone and therein mixing it with the hydrocarbon feed stock prior to introducing said stock into said reaction zone, introducing said mixture of heat-carrier material and hydrocarbon stock into said reaction zone and recycling said heat-carrier material with said catalyst from said reaction zone to said regeneration zone.

4. The process of claim 3 wherein catalyst is removed from said heat carrier before mixing with hydrocarbon feed stock by an upflowing stream of gas injected into said heat carrier.

5. The process of claim 3 wherein an oxidizing gas is injected into said heat carrier before mixing with said feed stock, thereby raising its temperature above the temperature of said catalyst regeneration zone, as a result of the combustion of carbonaceous deposits.

6. The process of claim 3 wherein the feed stock charged to said mixing zone is an oil which is vaporized by the heat obtained from contact with said heat-carrier material.

7. The process of claim 3 wherein catalyst being recycled from said regeneration zone to said reaction zone is mixed with hydrocarbon feed stock and heat-carrier material flowing from said mixing zone to said reaction zone.

8. The process of cracking a heavy oil containing unvaporizable constituents by the action of a solid conversion catalyst without excessive contamination of said catalyst which comprises contacting the vapor of said oil with said catalyst in dense fluid suspension in an upflowing reaction zone, continuously withdrawing a dense fluid stream of said catalyst from the dense phase within said reaction zone to a regeneration zone and contacting it therein with an upflowing stream of oxygen-containing gas while maintaining the catalyst in dense fluid suspension therein, recycling regenerated catalyst from the dense phase within said regeneration zone back to said reaction zone, circulating between said regeneration zone and reaction zone a finely divided, solid, inert heat-carrier material having a sufficiently greater particle size and density to effect segregation by settling as a lower dense fluid layer in said regeneration zone, withdrawing hot heat-carrier material from said lower layer within said regeneration zone to a mixing zone, and mixing it therein with said heavy oil, thereby effecting substanially complete vaporization of the vaporizable constituents thereof, charging the resulting mixture of oil vapors and heat-carrier material to said reaction zone and recycling said heat-carrier material with catalyst from said reaction zone to said regeneration zone.

9. In the process of converting hydrocarbons in a system comprising a catalytic reaction zone and a catalyst regeneration zone wherein said hydrocarbons are contacted at conversion temperature, in said reaction zone with absorption of heat, with a fluidized, finely divided, solid catalyst maintained in dense phase suspension by the upflowing vapors of said hydrocarbons and the catalyst is thereafter regenerated by conducting it to said regeneration zone where it is contacted at a higher temperature with evolution of heat with an oxygen-containing regeneration gas, the catalyst being maintained in dense fluid suspension in said regeneration zone by said regeneration gas flowing upwardly therethru, the regenerated catalyst is recycled to said reaction zone and said reaction zone is supplied with heat from said regeneration zone by recycling therebetween an inert, finely divided, solid, heat-carrier material having a higher density and particle size than that of said catalyst, the improvement comprising maintaining a higher vapor velocity in said reaction zone than that maintained in said regeneration zone, thereby preventing segregation of heat-carrier material in said reaction zone while permitting segregation of heat-carrier material as a lower fluidized layer in said regeneration zone, conducting heat-carrier material from said lower layer to a mixing zone, mixing hot heat-carrier material and hydrocarbon feed stock in said mixing zone, thereby heating said stock to a reaction temperature, and introducing the mixture of heat-carrier material and hydrocarbon feed stock vapors into said reaction zone.

10. An apparatus for the conversion of heavy hydrocarbon oils which comprises a vertically elongated regeneration chamber and a vertically elongated reaction chamber, a conduit for conducting a dense fluidized stream of powdered catalyst from an intermediate point in said regeneration chamber to a low point in said reaction chamber, a vertically elongated stripping tower adjacent said reaction chamber, a conduit for conducting fluidized catalyst from said reaction chamber to said stripping tower, means for injecting a stripping gas into a low point of said stripping tower, a conduit for conducting fluidized catalyst from the base of said stripping tower to a low point in said regeneration chamber, means for injecting an oxidizing gas into the base of said regeneration chamber, means for withdrawing spent regeneration gas from the top of said regeneration chamber, a heavy hydrocarbon oil vaporizing chamber and means for injecting heavy hydrocarbon oil feed stock therein, a conduit for conducting a hot dense fluidized suspension of a heat carrier material from a low point in said regeneration chamber to said vaporizing chamber, a conduit for conducting the resulting hydrocarbon vapors and heat carrier material in suspension therein to a low point in said reaction chamber and a conduit for withdrawing hydrocarbon reaction products from the top of said reaction chamber.

11. The apparatus of claim 10 wherein said conduit for conducting catalyst from said stripping tower to said regeneration chamber enters said regeneration chamber at a point above the conduit for withdrawing heat-carrier material from said regeneration chamber to said vaporizing chamber.

FRED W. SCHEINEMAN.

REFERENCES CITED

The following references are of record in the file of this patent:

UNITED STATES PATENTS

| Number | Name | Date |
|---|---|---|
| 2,387,309 | Sweeney | Oct. 23, 1945 |
| 2,393,636 | Johnson | Jan. 29, 1946 |
| 2,400,176 | Thiele | May 14, 1946 |